United States Patent [19]

Hsu

[11] Patent Number: 5,694,908
[45] Date of Patent: Dec. 9, 1997

[54] AUXILIARY WATER-SUPPLY SYTEM FOR AN INTERNAL COMBUSTION ENGINE

[76] Inventor: Chih-Cheng Hsu, 41F, No. 787, Chung Ming South Rd., Tai-Chung, Taiwan

[21] Appl. No.: 646,765

[22] Filed: May 8, 1996

[51] Int. Cl.$^6$ ............................................. F02P 15/08
[52] U.S. Cl. .............. 123/637; 123/25 A; 123/25 B; 123/25 M; 123/25 K; 123/25 E; 123/25 F
[58] Field of Search ................. 123/25 R, 25 A, 123/25 B, 25 E, 25 F, 25 M, 25 K, 636–639

[56] References Cited

U.S. PATENT DOCUMENTS

| | | | |
|---|---|---|---|
| 3,141,447 | 7/1964 | Jernigan | 123/25 B |
| 3,911,871 | 10/1975 | Williams et al. | 123/25 K |
| 4,461,245 | 7/1984 | Vinokur | 123/25 K |
| 4,476,817 | 10/1984 | Lindberg | 123/25 B |
| 4,502,420 | 3/1985 | Mezger | 123/25 J |
| 4,632,067 | 12/1986 | Carlson | 123/25 B |
| 4,884,533 | 12/1989 | Risitano et al. | 123/25 K |
| 4,986,223 | 1/1991 | Mahoney | 123/25 B |
| 4,991,395 | 2/1991 | Markou et al. | 123/25 B |
| 5,125,366 | 6/1992 | Hobbs | 123/25 J |
| 5,150,682 | 9/1992 | Magnet | 123/25 J |
| 5,259,357 | 11/1993 | Shimizu et al. | 123/638 |

*Primary Examiner*—Erick R. Solis
*Attorney, Agent, or Firm*—W. Wayne Liauh

[57] ABSTRACT

An improved auxiliary water-supply device for use with an internal combustion engine system is disclosed. It contains: (a) a water storage device; (b) a water level sensing device for sensing the water level of the water storage device, an engine temperature sensor for sensing the engine temperature of the internal combustion engine system, and an engine speed sensor for sensing the engine speed of the internal combustion engine, (c) a water supplying device for supplying water from the water storage device to the internal combustion engine when the water level is higher than a preset level, the engine temperature is higher than a preset temperature and the engine speed is higher than a preset speed value; (d) an exhaust-gas re-circulation (EGR) device placed between the water storage device and the internal combustion engine for mixing water with exhausted gas; and (e) an auxiliary ignition pulse generator for generating auxiliary ignition pulses in the internal combustion engine between two regular ignition pulses when water is supplied to the internal combustion engine.

6 Claims, 5 Drawing Sheets

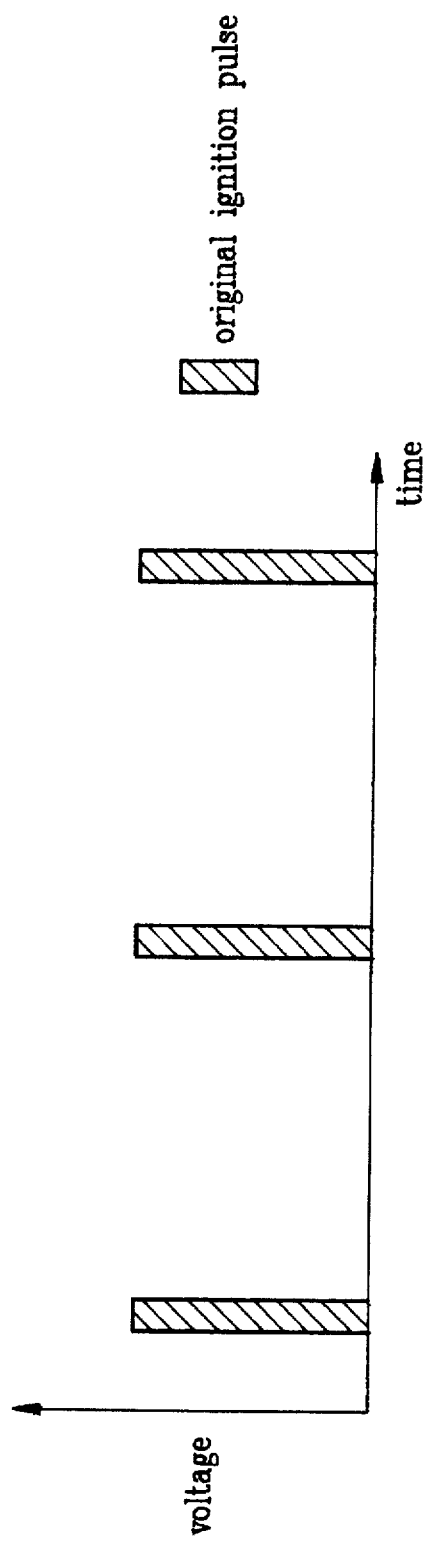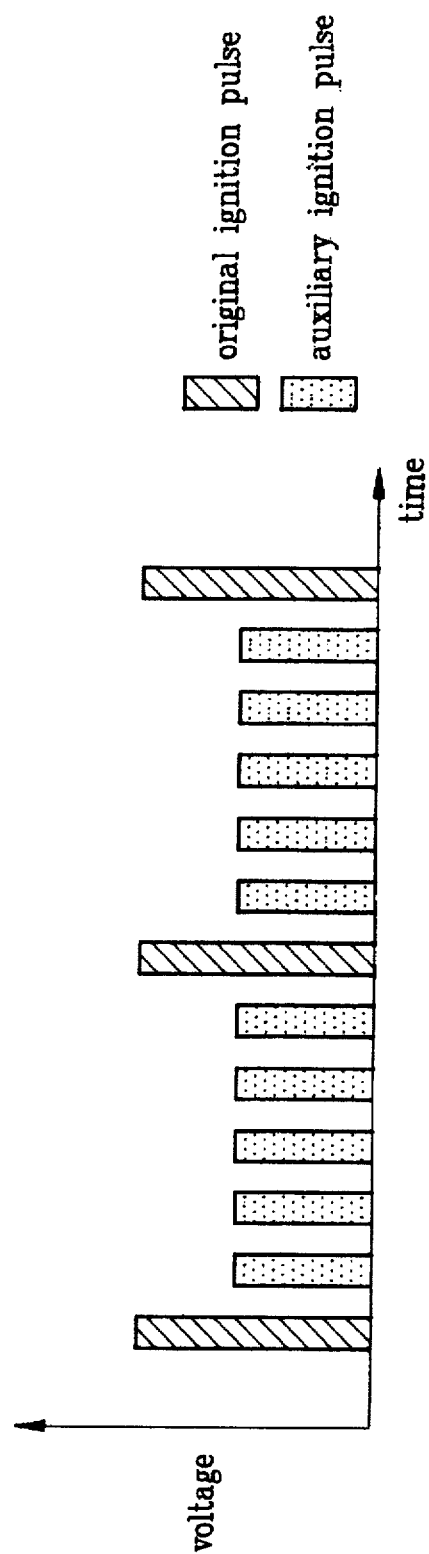

AUXILIARY WATER-SUPPLY SYTEM FOR AN INTERNAL COMBUSTION ENGINE

FIELD OF THE INVENTION

This invention relates to an auxiliary water-supply system for an internal combustion engine, and particularly to an auxiliary water-supply system for a gasoline-type internal combustion engine.

BACKGROUND OF THE INVENTION

Normally, air comprises about 20% of oxygen and 80% of nitrogen. If an engine can have a complete combustion, the gas exhaust out of an engine would be converted into water (hydrogen oxide, $H_2O$) and carbon dioxide, ($CO_2$) completely. However, the combustion in an engine is usually an incomplete combustion, i.e., the gasoline vapor in an engine can not be converted into $CO_2$ and $H_2O$ completely. The gas exhausted out of an engine usually contains CO and HC; CO is a poisonous gas, which can cause a person to die. The combustion in an engine is usually at a high temperature, and therefore the waste gas exhausted usually contains nitrogen oxide ($NO_x$), which usually converts into a photochemical smog.

In brief, the aforesaid pollution waste, such as CO, HC and $NO_x$, not only are harmful to human health, but also harmful to environment. Therefore, every government in the world has tried to reduce the density of the pollution waste exhausted out of cars.

Usually, there are three methods for controlling the waste exhausted out of a car, i.e., (1) a crankcase emission control system; (2) an evaporative emission control system; and (3) an exhaust emission control system. The present invention improves the combustion condition of the conventional engine system so as to reduce the density of the pollution waste exhausted thereof; the theory of the present invention is described in detail in the following paragraphs.

Referring to FIG. 1, it shows the relation between the driving speed of a typical car and the air/fuel ratio. When a car is started, the gas vapor thereof is low because the initial temperature is low. Therefore, the engine thereof requires a lower air/fuel ratio (i.e., the gasoline should have a higher supply). However, the combustion efficiency in the cylinder is not good, and large mount of CO and HC will be exhausted. When a car is running at a mid-speed (20 km/h to 113 kin/h), the engine has a better combustion efficiency; then, the amount of CO and HC exhausted will be reduced. When the engine is running at a high speed, the engine requires a higher air/fuel ratio; at this time, the engine has a higher temperature, and therefore it is prone to having a spark knock or detonation, and consequently a higher $NO_x$ will be exhausted.

In order to reduce the density of the pollution waste, such as HC, CO and $NO_x$, the inventor believes that the ignition device may be improved by reducing the engine temperature, increasing the contact area of the gasoline vapor so as to improve the combustion efficiency, and to increase the supply of oxygen, or to improve the ignition time. According to the present invention, the improvement is done by improving the contact area of the gasoline vapor, increasing the supply of oxygen, and reducing the combustion temperature of engine. The technical method to obtain the aforesaid results will be described in the following paragraphs.

Generally, a car running in a dry area, such as in a desert would consume more gasoline. On the contrary, a car running in a wet area, such as a sea coast area, would consume less gasoline. In other words, the humidity or water vapor will affect the combustion efficiency of an engine because of the specific gravity of gasoline is different from that of water, i.e., the specific gravity of gasoline is lower than that of water, and therefore they can not be compounded together. Before the vaporized gasoline and water entering the combustion chamber, the particles of the gasoline vapor having lower specific gravity are attached to the surface of the water particles. After the water particles entering into the cylinder, the water particles will expand under high temperature and high pressure, and the gasoline particles attached to the water particles will be divided, or become smaller, i.e., the contact area between the gasoline and the air will be increased (i.e., the mixed efficiency is increased). The oxygen contained in water will augment the combustion effect to provide a complete combustion. In other words, the horsepower of the engine will be augmented, and at the same time a fuel-saving result will be obtained, and carbon deposit in the cylinder will be reduced. As a result, the serviceable life of the engine will be increased, while maintenance cost thereof will be reduced: The HC and CO exhausted will be reduced, too. Since water can lower the engine temperature, the $NO_x$ exhausted will be reduced, and then the waste exhausted will have a less harmful impact to the environment.

The auxiliary water-supply system for an internal combustion engine according to the present invention is developed and designed in accordance with the aforesaid theory and the characteristics of the gasoline engine. When the engine is running at a high speed or a high temperature, a suitable amount of water can be added therein so as to augment the combustion efficiency, and to reduce the HC, CO, and $NO_x$ exhausted. In order to further augment the combustion efficiency of an engine, the present invention uses a continuous ignition method, i.e., a plurality of cyclic auxiliary ignition pulses are inserted between two original ignition pulses so as to augment the combustion efficiency of engine (particularly when the engine is started cold), and to reduce the HC and CO exhausted.

Furthermore, the present invention has another advantage i.e., the present invention can be simply installed in a cars which have been rolled out of a factory so as to improve the combustion efficiency thereof, and to reduce the HC, CO and $NO_x$ exhausted. Other advantageous of the present invention will be described in details with the accompanying drawings in the following paragraphs.

SUMMARY OF THE PRESENT INVENTION

The prime object of the present invention is to provide an internal combustion engine system so as to improve the combustion efficiency of the engine, and to reduce the density of the pollution waste exhausted thereof.

Another object of the present invention is to provide an auxiliary water-supply system for an internal combustion engine, which can be installed in a car already rolled out of a factory so as to improve the combustion efficiency of the engine and to reduce the density of the pollution waste exhausted thereof.

Still another object of the present invention is to provide an improved ignition method, which can provide a plurality of cyclic auxiliary ignition pulses between two original ignition pulses so as to augment the combustion efficiency of an engine, and to reduce the pollution waste exhausted thereof.

BRIEF DESCRIPTION OF THE DRAWINGS

FIG. 5A illustrates an ignition pulse diagram of a conventional igniter.

FIG. 5B illustrates an ignition method for an internal combustion engine according to the present invention.

DETAILED DESCRIPTION

Figure 1:
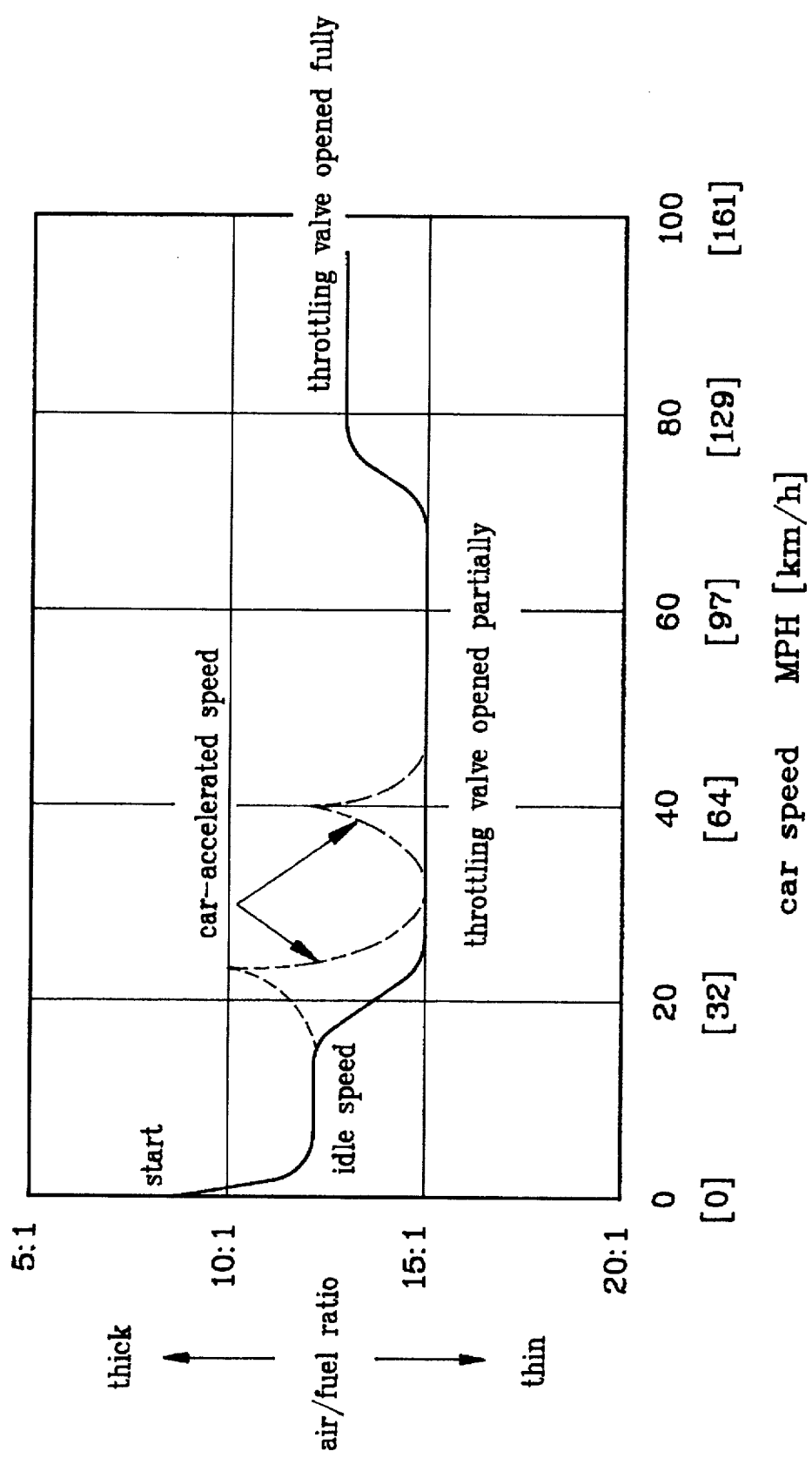
FIG. 1 illustrates the relation between the car speed and the air/fuel ratio.
Figure 2:
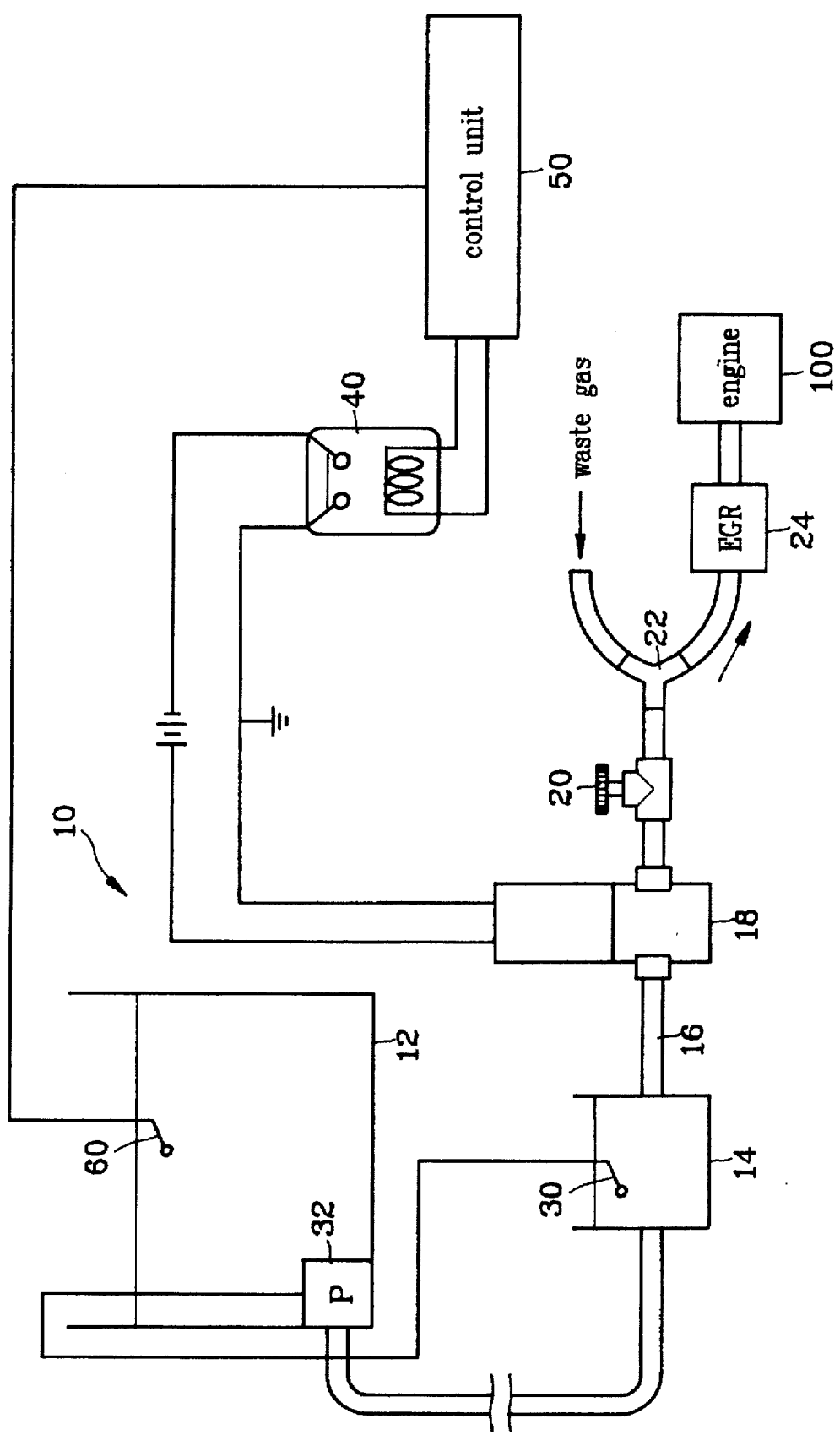
FIG. 2 is a diagram of the present invention, showing an auxiliary water-supply system for an internal combustion engine.

Referring to FIG. 2, it illustrates an auxiliary water-supply system for an internal combustion engine according to the present invention. An auxiliary water-supply system 10 of an internal combustion engine and a gasoline engine 100 are assembled together. The engine can be of any type of any kind. The auxiliary water-supply system 10 includes a water-supply device having a small water tank 14, into which water is supplied from a large water tank 12. A small tank sensor 30 is installed in the small water tank 14. As soon as the water in the small water tank 14 is lower than a given level, a water pump 32 will be started to pump water out of the large water tank 12 to the small water tank 14. The small water tank 14 is connected with a water pipe 16, in which a control valve 18 such as a solenoid valve is installed. The control valve 18 is controlled by a relay 40 which is controlled by a control unit 50. The unit 50 will be described in detail in following paragraph. The water pipe 16 is also being furnished with a manual water regulator 20 for controlling the water flow. One end of the water pipe 16 is connected with a three-way joint 22, of which the second end is connected with an exhaust manifold; the third end of the three-way joint 22 is connected with an EGR (exhaust-gas recirculation) device 24, which is connected with the gasoline engine 100. The object of using the EGR device is to lower the exhausting volume of $NO_x$. Water can flow through the EGR device 24, and enter the gasoline engine 100 with a portion of exhausted gas simultaneously so as to increase the combustion efficiency of the engine, while reducing reduce the density of the pollution waste (i.e., CO, HC and $NO_x$).

Figure 3:
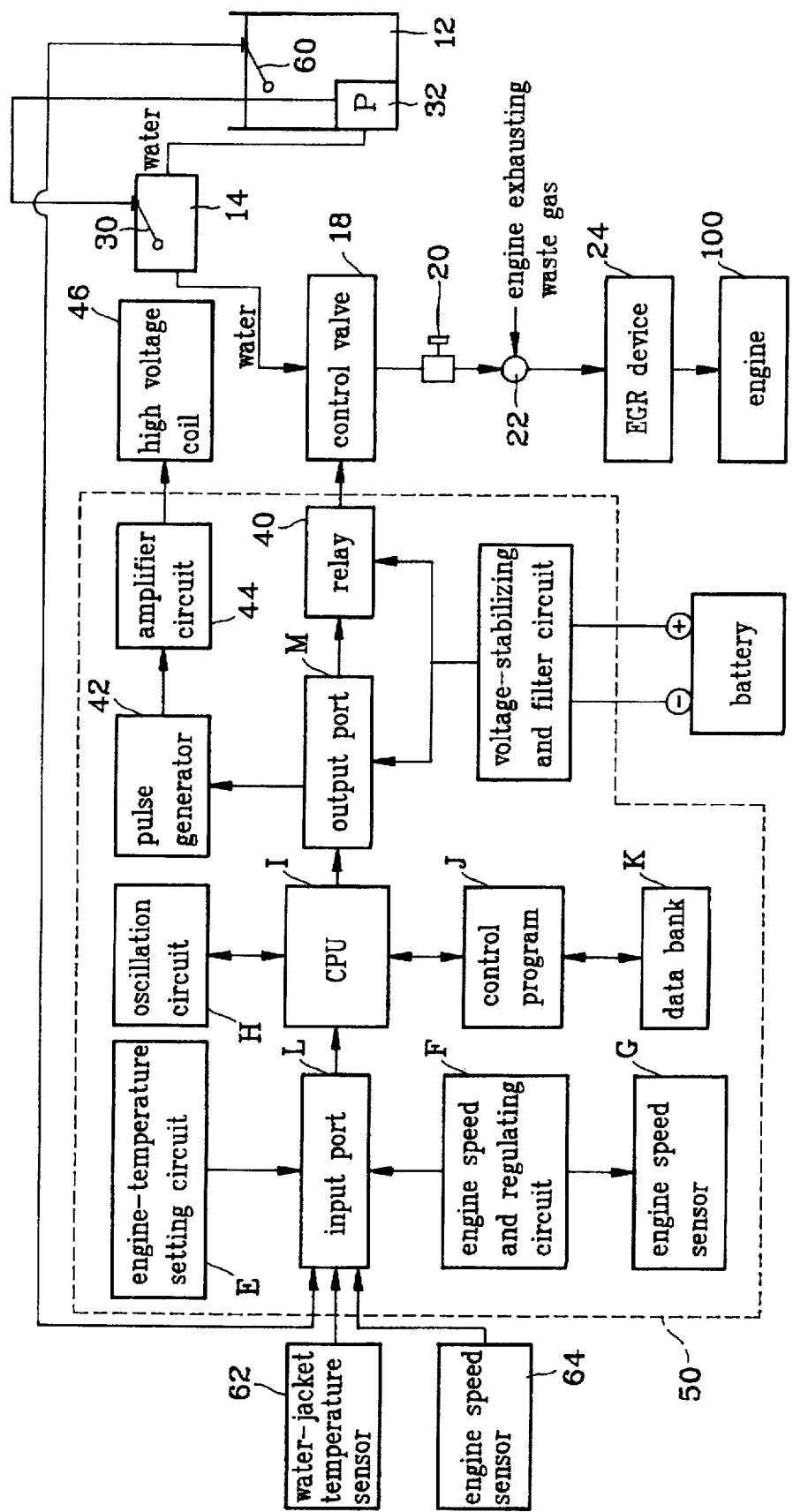
FIG. 3 is a block diagram of the present invention, showing a control method of the auxiliary water-supply system of an internal combustion engine.

Referring to FIG. 3, the control unit 50 includes:

(a) input port L, which can receive signals transmitting from a water-level sensor 60 of the large water tank, an engine speed sensor 64, an engine water jacket temperature sensor 62, an engine speed sensor 64, an engine temperature setting circuit E and an engine speed setting and regulating circuit F;

(b) a CPU I, which receives information from the input port L, performs a control program J according to the contents of a data bank K so as to make a logical judgment before sending out a control instruction;

(c) an output port M, which receives instructions of the CPU I and converts the instructions to an electrical signal to control a relay 40 and a pulse generator 42. The relay 40 can send out an electrical signal to the control valve 18, such as a solenoid valve; the control valve control the water flow in the water pipe 16 so as have a suitable mount of water flowed into the EGR device 24. An electrical signal from the pulse generator 42 will be sent to an amplifier circuit 44, which is connected with the high voltage coil 46 of an igniter.

As shown in FIGS. 5A and 5B, the pulse generator 42 can add extra ignition pulses between two ignition pulses of a conventional igniter so as to increase the combustion efficiency of the engine, and to reduce the density of the pollution waste exhausted.

Figure 4:
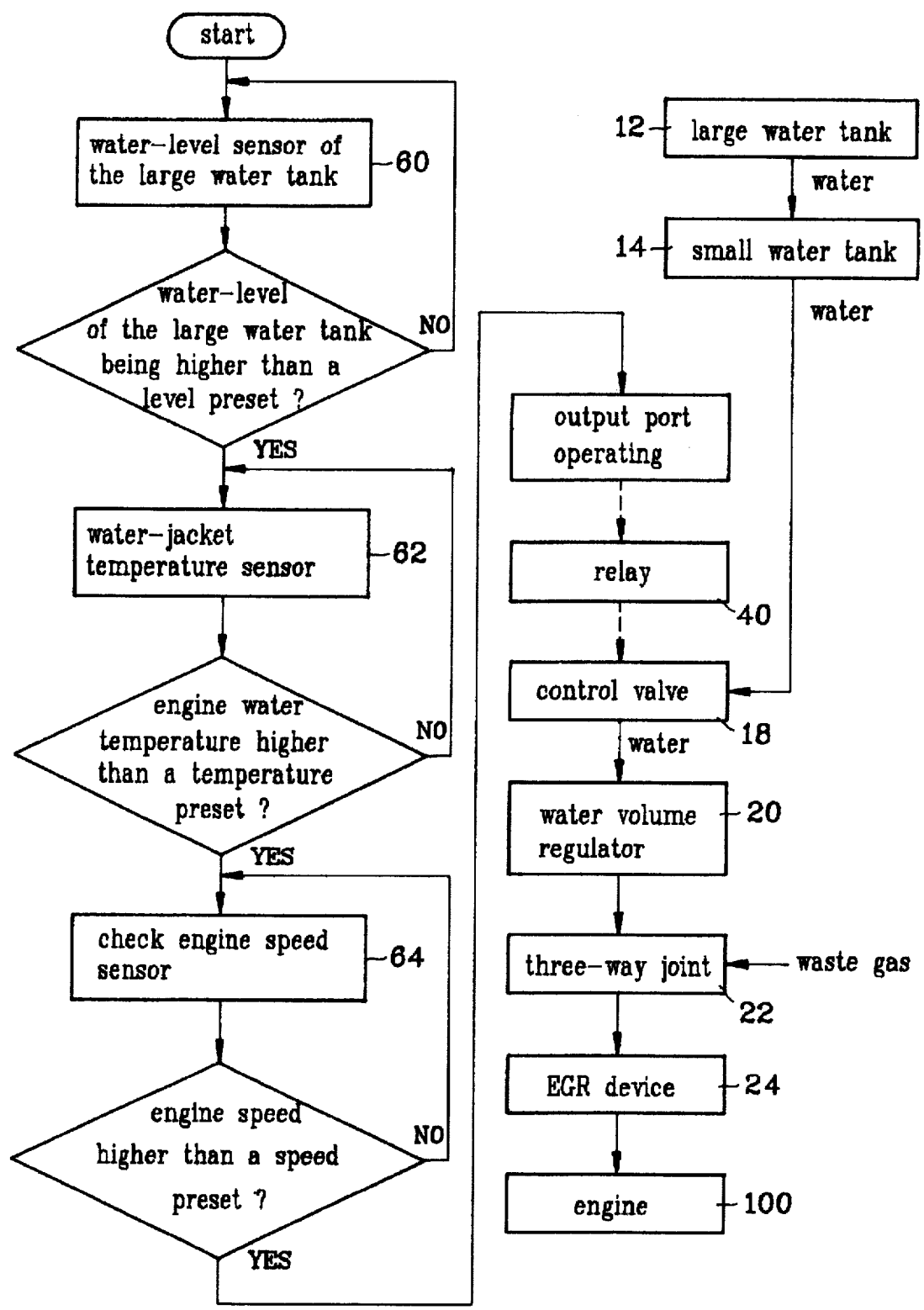
FIG. 4 is a control flow chart of a computer control unit for the auxiliary water-supply system of an internal combustion engine according to the present invention.

Referring to FIG. 4, it is shown a control flow chart of the control unit 50 as shown in FIG. 3 when the CPU I of the control unit 50 detects the following conditions from sensors, CPU I will send out an electrical signal to actuate the relay 40 to turn on the control valve 18 so as to water to flow through the small water tank 14, and entered into EGR device 24 in order to have water and exhaust gas entering into the cylinder simultaneously.

(a) water-level sensor 60 detects water level of large water tank being larger than a preset value;

(b) water-jacket temperature sensor 62 detects the engine temperature being higher than a preset engine temperature; and (c) engine speed sensor 64 detects engine speed being higher than a preset value.

The aforesaid preset values of water level, engine temperature and engine speed depend on the car model and engine displacement, and those data are stored in the aforesaid data bank K.

The auxiliary water-supply system according to the present invention may also include a linear control valve, which can appropriately control the opening size oft he valve in accordance with the engine temperature and the engine speed so as to supply a suitable amount of water to the EGR device, and to increase the combustion efficiency of the engine and to reduce the density of the pollution waste.

A report of exhaust test and energy consuming test for a car is provided by the Automotive Research of Testing Center in Taiwan as follows:

(a) Exhaust test:

Gasoline Car Pollution Test Report

Product Identification: Toyota Corona

Model: EXSIOR AT2EPN GL1 1.6 A4 four door gasoline car

Engine Family: G4A-FE-94 (no engine family applied).

Engine Model: Four cylinders installed in front part.

Fuel supply: Injection

Car Body No.: AT2-8018870

Engine No.: 4AF 742631

Tire Model: 185/65R 14 85H

Transmission Model: Automatic, four speeds

Mileage Gauge: 30237 Km

Conditions Tested:

Ambient Temperature: 23.3° C.

Atmospheric Pressure: 753.4 mmhg

Fuel: Gasoline 95 without lead

Car Weight: 1344 kg

Tire Pressure: 2.5 kgf/cm$^2$

Relative Moisture: 51%

Idle Speed: 800 rpm

Stend still Time: hours

Road Resistance: 446.9N at 80 km/hr

Time: 8.35 sec (85-75 km/hr)

Transmission Time:

Test Standards and Procedures:

1. The tests of car running condition, idle condition, fuel tank and EEC exhaust are done in accordance with the procedures and methods as prescribed in "Request for test certificate and new car spot check summary for gasoline car and substitute fuel car of second exhaust control standards".

2. Crank Case (PCV): In accordance with the test procedures and methods as prescribed in CNS 11496 D3166.

Test Instruments:

Car Body Dynamic Gauge: SCHENCK KOMEG EMDY 48 SHED Test:

Vaporization Hermetic Room: ETC PJ-101394
Fuel Processing Machine: WEISS KT 100/200+5-40 DU-EX
HC Analyzer: PIERBURG FID PM-2000 METHANE
Waste Gas Sampling System: HORIBA-9100S
Waste Gas Analysis System: HORIBA MEXA-9300
CO Analyzer: HORIBA FLA-120
$NO_x$ Analyzer: HORIBA CLA-150
Idle Speed Analyzer: HORIB A MEXA 574GE

| Gasoline Car pollution Test Report Test Results: Pollution Test Results | | | |
|---|---|---|---|
| Items Tested | $NO_x$ | HC | CO |
| Weight method | | | |
| Value tested Deteriorated coefficient | 0.15 g/km | 0.061 g/km | 0.46 g/km |
| Results | 0.15 g/km | 0.061 g/km | 0.46 g/km |
| Idle speed Density | | | |
| Value tested | | 8 ppm | 0.00% |
| Value Amended | | 8 ppm | 0.00% |

(b) Energy-consuming test:

Energy-consuming Test Report of Sedan
Model: TOYOTA CORONA EXSIOR AT 2EPN GL 11.6
Engine Model: Four cylinders installed in front part
Engine No.: 4AF 742631
Transmission Model: Automatic, four speeds
Ignition Timing: B.T.D.C.
Fuel used: Gasoline 95 without load
Idle Speed: 820 rpm
Ambient Temperature: 22.4° C.
Tire Pressure: 2.5 $kgf/cm^2$
Relative Moisture: 54%
Car Weight: 1344 kg
Atmospheric Pressure: 100.97 K Pa
Transmission Time:
Mileage Gauge: 30159 km

| Energy-consuming Test Result | | | | |
|---|---|---|---|---|
| Items Tested | Energy-Consuming in City | Energy-consuming at High Speed | Average Energy Consuming | Judgment |
| Standards Values Tested | 13.0 km/l | 17.1 km/l | 14.6 km/l | |

The following table is a comparison between the values tested of an engine with the auxiliary water-supply system according to the present invention and the exhaust pollution criteria as prescribed by Taiwan Provincial Government; it is apparent that the present invention can effectively reduce the density of the pollution waste exhausted.

| | Sedan, Travel Wagon | CO | HC | $NO_x$ |
|---|---|---|---|---|
| Value Prescribed | Car driven normally | 2.11 | 0.255 g/km | 0.62 |
| Value tested with the present invention | Idle speed After Test | 1.0 0.46 | 200 ppm 0.061 g/km | 0.15 g/km |

The auxiliary water-supply system for an internal combustion engine according to the present invention can easily be installed in any car that has been manufactured from a factory, i.e., it can be mounted on the EGR device of a car so as to increase the combustion efficiency, to reduce the density of the pollution waste exhausted and to increase the serviceable life of an engine.

In brief, the auxiliary water-supply system for an internal combustion engine according to the present invention has the following advantageous:

(a). The present invention can be installed easily in a car having rolled out of a factory so as to increase the combustion efficiency, to reduce the density of the pollution waste exhausted and to increase the serviceable life of an engine.

(b). The internal combustion system according to the present invention can effectively increase the combustion efficiency, reduce the density of the pollution waste, and increase the serviceable life of an engine.

(c). The ignition method according to the present invention enables a car engine to have completed combustion, and a low density of exhausting HC and CO.

The aforesaid description is a preferred embodiment according to the present invention, and the present invention is not limited by the aforesaid embodiment. Any modification similar thereto by a person skilled in the art will be deemed within the scope of the present invention.

I claim:

1. An auxiliary water-supply device for use with an internal combustion engine system, comprising:

(a) water storage means;

(b) water level sensing means for sensing the water level of said water storage means, engine temperature sensing means for sensing the engine temperature of said internal combustion engine system, and engine speed sensing means for sensing the engine speed of said internal combustion engine;

(c) water supplying means for supplying water from said water storage means to the internal combustion engine when said water level is higher than a preset level, said engine temperature is higher than a preset temperature and said engine speed is higher than a preset speed value;

(d) an exhaust-gas recirculation (EGR) device placed between said water storage means and the internal combustion engine for mixing water with exhausted gas; and (e) an auxiliary ignition pulse generator for generating auxiliary ignition pulses in the internal combustion engine between two regular ignition pulses when water is supplied to the internal combustion engine.

2. The auxiliary water-supply device for use with an internal combustion engine system as claimed in claim 1 wherein said water supplying means comprises:

(a) a water pipe and a control valve disposed between said supply storage means and said EGR device;

(b) a CPU connected to said water level sensing means, said engine temperature sensing means, and said engine speed sensing means, for controlling said water flow into said EGR device by turning on said control valve when said water level is higher than said preset level, said engine temperature is higher than said preset temperature and said engine speed is higher than said preset speed value.

3. The auxiliary water-supply device for use with an internal combustion engine system as claimed in claim 2 wherein said water supplying means further comprises a manual valve for further controlling said water flow into said EGR device.

4. The auxiliary water-supply device for use with an internal combustion engine system as claimed in claim 2 wherein said control valve is a linear control valve, by which the amount of said water flow into said EGR device is proportional to said engine temperature and said engine speed.

5. The auxiliary water-supply device for use with an internal combustion engine system as claimed in claim 1 wherein said water storage means comprises a large water tank and a small tank, said larger water tank supplying water to said small tank, which then supplies water to the internal combustion engine, and said water level sensing means sensing a water level of said small water tank.

6. The auxiliary water-supply device for use with an internal combustion engine system as claimed in claim 1 wherein said auxiliary ignition pulse generator is connected to all spark plugs of said internal combustion engine.

* * * * *